Patented Dec. 18, 1934

1,984,470

UNITED STATES PATENT OFFICE 1,984,470

FOOD PRODUCT AND METHOD OF MAKING SAME

Daniel A. Farrell, Chicago, Ill., assignor to John F. Jelke Company, Chicago, Ill., a corporation of Illinois No Drawing. Application November 23, 1932, Serial No. 644,140

13 Claims. (Cl. 99—11)

This invention relates to an edible product and to a process for its preparation. More particularly, the invention relates to a flavored fatty product, such as is especially adapted for use as a spread for bread, crackers and the like, as a filler for cakes and pastries, and also as a shortening agent. The invention contemplates the incorporation of a substantial quantity of an aqueous liquid containing a flavoring material into a fat or a mixture of fats to produce a substantially permanent and homogeneous emulsion.

I have found that an emulsified product of this character may be obtained by incorporating a suitable aqueous flavoring material, such as a chocolate-bearing material, into fats or a mixture of fats and that the chocolate-flavored product is admirably suited for use as a spread or for shortening purposes.

It is, therefore, an object of this invention to provide a flavored fat product and particularly a chocolate-flavored product for use as a spread for bread, cake, crackers and for various other uses in the preparation of food products.

It is a further important object of this invention to provide a method of incorporating a relatively large proportion of an aqueous flavoring material, such as a chocolate-bearing syrup, into a fat or mixture of fats to produce a substantially permanent and homogeneous emulsion of the proper consistency and texture to serve as a spread, filler or the like.

Other and further important objects of this invention will become apparent from the following description and appended claims.

While in general the fatty base of the product of my invention may be either an animal fat or a vegetable fat, or a mixture of the two, it is important that the fats or mixture of fats be so selected or blended as to give the proper consistency and texture to the finished product, if a product having the most satisfactory properties and characteristics for use as a spread is to be obtained.

In using animal fats as the fatty base of my product, I may select various commercially obtainable animal fats, such as oleo oil, oleo stock, stearines and the like, lard and other refined animal fat products. Lard, because of its characteristics as to consistency and texture is especially well suited for use in my product, but cannot be satisfactorily used alone because of its relatively low melting point, unless the product is to be packaged in jars or other similar containers. Lard can, however, be hydrogenated to give a product of the required melting point that would permit its use by itself.

Ordinarily it is more satisfactory in the production of a final product that is capable of being printed, to use with the lard a sufficient quantity of a high melting point oil or fat, such as oleo oil. When using lard I prefer to use a neutral lard, which, as is commonly known, may be prepared from leaf lard by discharging the hot lard into a stream of ice-cold water. During this treatment the water soluble impurities in the lard are dissolved by the water and the lard is crystallized into small globules, which may then be separated from the water and the soluble impurities by any mechanical means. Various grades of lard may be used in the process, but I prefer the neutral lard because it produces a product of superior flavor.

Oleo oil, as referred to above, is prepared from beef fat or tallow, particularly from the fat occurring around or near the stomach. This particular grade of beef fat is also known as "prima jus." It has a melting point of about 28° C. and iodine value of 40 to 50 and a saponification value of 198 to 205.

I have also found that vegetable fats may be employed in conjunction with animal fats or may be used by themselves to constitute the fatty base of my product. The term "fat" is used as including both solid and liquid fats, to which latter the term "oil" is commonly employed. Examples of suitable vegetable fats are cotton seed oil, cocoanut oil, soya bean oil, corn and sesame oil, peanut oil and sun flower oil. In general any of the so-called edible oils and fats may be used.

In preparing a chocolate-flavored fatty product, I prefer to use an aqueous syrup containing a chocolate-bearing material. By this is meant a material containing chocolate, or cocoa or a mixture of the two. Other flavors in aqueous solution or suspension, such as maple, coffee, lime, lemon, and aqueous syrups generally, such as sugar syrups, may be employed.

In order to incorporate these aqueous syrups into the fatty base, I found that it is most satisfactory to use a suitable emulsifying agent, and preferably an emulsifying agent capable of causing a substantially permanent and homogeneous emulsion of the fatty base with a substantial proportion of an aqueous liquid. It will be understood, however, that under some circumstances no separately added emulsifying agent need be used, since some of the ingredients, such as milk or the chocolate syrup added, may contain substances having sufficient emulsifying power.

Where an aqueous chocolate syrup is being incorporated into the fatty base, it is generally necessary that an efficient emulsifying agent be used because of the relatively large proportion of the aqueous chocolate syrup that must be emulsified with the fatty base. Owing to the contrasting color of the chocolate syrup with the white or substantially uncolored fatty base, it is necessary in preparing a chocolate-flavored product to use a relatively large proportion of the aqueous chocolate syrup in order to distribute the chocolate as uniformly as possible to minimize the appearance of the uncolored fat particles in the final product.

The preferred class of emulsifying agents are those comprising a glyceryl ester of a higher fatty acid and a sodium sulphoacetate. A commercial preparation containing this class of emulsifying agents is available in the open market under the name "Emargol". This preparation is a complex fatty mixture containing approximately 50 to 55% moisture and from 45 to 50% of fatty matter of which the active emulsifying agent is monostearyl glycerine sodium sulphoacetate, the latter amounting to aproximately 15 to 20% of the preparation.

The structural formula of the monostearyl glycerine sodium sulphoacetate is believed to be as follows:

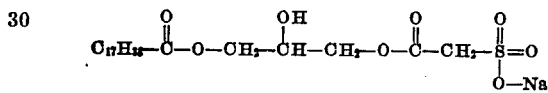

Some of the equivalents of the monostearyl glycerine sodium sulphoacetate are monomelissyl glycerine sodium sulphoacetate. The stearic acid may be replaced by any fatty acid residue containing between 8 carbons and 30 carbons, and the substance will still function like monostearyl glycerine sodium sulphoacetate. However, as the molecular weight of the fatty acid diminishes, the emulsifying power also diminishes somewhat.

Although this emulsifying agent gives a superior result and is preferable to all others that I have tried, my invention is not limited to this specific emulsifying agent since I have found that various other substances such as agar-agar, gum tragacanth, and other gums may also be used as emulsifying agent in my composition.

In preparing my product using an animal fat base, I prefer to use the following ingredients in the proportions specified:

| | Parts by weight |
|---|---|
| Neutral lard | 40 to 60 |
| Oleo oil, or other fats | 60 to 40 |
| Milk (optional) | 30 |

As previously stated, other forms of lard and lard-like substances may be used in place of neutral lard, or the lard may be omitted entirely and the oleo oil, either by itself, or admixed with other fats, used to constitute the fatty base.

When my composition is intended for summer use, a fatty substance known as oleo stock may be substituted for part of the oleo oil. Oleo stock is a fatty substance having a stearin content of about 33% and which is completely melted at 50° C.

My invention also contemplates the substitution for the lard of a vegetable oil, such as cotton seed oil, or any other of the soft vegetable oils, such as mentioned above.

The method of treating the fat or mixture of fats to be used as a fatty base of my product is substantially the same where animal fats or mixtures of animal and vegetable fats and oils are used. The fat or fat mixture is churned thoroughly at a temperature, of from 23 to 24° C., and then crystallized by pouring the flowable fat mass into cold water, preferably at a temperature of 2° C. Other methods of crystallizing, such as commonly known in the art are also contemplated.

The fatty material, thus prepared, is next mixed with the other ingredients, as specified in the following formula in preparing a chocolate-flavored product:

| | Parts by weight |
|---|---|
| Fatty mixture | 100 |
| Chocolate syrup | 50 |
| Emulsifying agent | ½ |

A chocolate syrup of the following formula is especially satisfactory for use in the preparation of a chocolate-flavored product:

| | Per cent by weight |
|---|---|
| Sugar | 60–62 |
| Water | 20–18 |
| Cocoa | 12 |
| Chocolate | 7 |
| Salt, Vanilla, or other flavoring material— (Balance) | |

While the above composition for the chocolate syrup is preferred, it will be understood that the proportions may be varied widely and that either cocoa or chocolate may be used alone, or in mixtures of the two.

The aqueous chocolate syrup is added to the fatty base without the application of heat, and with the fatty material in a solidified condition. In mixing the aqueous syrup with the solidified fatty material, it is possible because of the relatively large proportional volume of aqueous chocolate syrup to effect a thorough distribution of the chocolate-bearing material throughout the mass of the fat, and thus obtain a product that is substantially free from conspicuous uncolored fat particles. The use of an efficient emulsifying agent makes possible the incorporation of a relatively large proportion of an aqueous syrup into a fatty base to form a substantially permanent and homogeneous emulsion. To the best of my knowledge this has not been heretofore possible.

In using vegetable fats or oils as the fatty base, I prefer to use a high melting point oil as a substantial constituent, such as cocoanut oil, either hydrogenated or not.

While the cocoanut or other equivalent oil makes up the larger portion of my composition, I find, in order to manufacture the desired product economically, it is necessary to use a small proportion of some higher melting fat or its equivalent, for which purpose hydrogenated cocoanut oil is very satisfactory. Peanut oil or hydrogenated cotton seed or other oil of similar characteristics may be substituted either wholly or in part for this hydrogenated cocoanut oil.

Aside from the above ingredients, a small amount of a low melting point oil such as unhydrogenated cotton seed oil may be added to advantage. As an illustration of one modification of my invention, I give the following formula for the fatty ingredients, which may be modified by adding more or less of the alternative ingredients mentioned above:

| | Pounds |
|---|---|
| Cocoanut oil | 1800 |
| Cocoanut oil (hydrogenated) | 500 |
| Cotton seed oil | 300 |

In preparing a mix of these ingredients the hydrogenated and unhydrogenated cocoanut oils are preferably first mixed together by churning at a temperature of approximately 90° F., at which temperature the oils are free-flowing, and the agitation continuing over a period of approximately three minutes.

The proportion of hydrogenated cocoanut oil used may vary considerably from the figure given above. Similarly, the proportion of cotton seed oil is not critical, and various other low melting point oils can be substituted wholly, or in part, for the cotton seed oil.

At this point, thirty gallons of water at a temperature of about 46° F. are placed in the churn with the fat base and the whole mass is agitated for about five minutes. Then the 300 lbs. of cotton seed oil, which should be at a temperature of about 80° F. are mixed in. At this point the mass will be in a flowable state. The important feature during this step is to prevent the oils from graining. The temperatures above are selected with this in mind but are not critical.

The next step is to pour this flowable mass into cold water maintained at a temperature of about 34° F. to crystallize the fats. This is accomplished by flowing the fatty mass into a stream of the cold water, whereupon the fatty mass is broken up and quickly chilled to produce small globules or granules of fat. The stream flows for such a distance that the fat and water will remain together for preferably less than two minutes, after which time the fat is mechanically removed from the water and dumped into a large mass of water at a temperature of 67° F. This latter temperature is important, and for best results should not be permitted to vary by more than 2° F. either way. The fat, being in a highly subdivided state before being charged into the water, is rapidly and uniformly brought to very nearly the temperatures of the water and at that temperature coalesces again into a large unitary mass.

After leaving this water bath, the fat is placed in a continuous working device, preferably one having screw blades, and is worked until the water content is brought down to about 9%. When this point is reached, the mass is removed to a butter worker, comprising a revolving table and wooden roll, and is worked on this device until the moisture content is reduced to about 7%. The exact manner of working is not critical, neither is it necessary to use the specific types of machines mentioned above. Since the object of this working is to reduce the moisture content, preferably to below 9%, it is evident that any device which will accomplish this object will be operative. However, the particular arrangement discussed above, or the equivalent thereof, has the virtue that all particles are properly worked so that the tendency for white particles to appear in the finished product is lessened by this particular procedure.

After the moisture content has been reduced to 7% and the mass has been thoroughly worked to maintain all parts of the mass at the same temperature, so as to eliminate most, if not all, of the hard particles, the material is placed in a tempering room, where it is held at a temperature of about 64 to 68° F. for from twelve to eighteen hours.

After the tempering is finished, the material is mixed with milk, for example, about twenty gallons of milk for each 2600 pounds of fatty material.

It is desirable to work or mix the fatty material with the milk and aqueous chocolate syrup after the moisture content has been reduced the proper amount, but if this cannot be done because of insufficient equipment, the fatty material must be kept under close temperature control in a tempering room.

Preferably, the milk should be slightly acid. This may be accomplished by adding a suitable amount of lactic acid culture and ripening the milk to about .85% acidity. At the time that the milk is added, a suitable amount, for example, about 3% of an emulsifying agent should be added. These ingredients are then thoroughly worked together at room temperature.

About 1560 lbs. of a suitable aqueous chocolate syrup, preferably of the composition above given, also at ordinary room temperature, are then added and thoroughly worked into the mass without the application of heat. At this time about ½% of salt, based in the total weight of the mix, may be added.

After these ingredients have been worked together until the mass is smooth and of suitable texture, the mass is spread in thin layers to permit it to reach a uniform temperature in the shortest possible time, and is chilled to render it capable of being printed. After this it may be printed and packed for shipment and sale. If the product is to be packaged in glass or other similar containers, however, this chilling step is unnecessary.

Regardless of whether an animal fat, a vegetable fat or oil, or a mixture of the two be used as the fatty base of my product, the final product has a fat as its major constituent. A typical analysis of my chocolate-flavored product is as follows:

| | |
|---|---|
| Moisture | 15.48 |
| Fat | 57.00 |
| Protein | 2.23 |
| Sugar | 18.85 |

Reducing (dextrose and invert) 6.47.
Non-reducing—(sucrose) 12.38.

| | |
|---|---|
| Caffeine | 0.04 |
| Theobromine | 0.15 |
| Crude fibre | 0.60 |
| Salt | .70 |
| Ash | 0.90 |
| | 95.63 |
| Starch by difference | 4.37 |
| | 100.00 |

While it will be understood that the percentages given in the above analysis may vary considerably, in general, the fatty content is over 50% by weight of the total product. The aqueous portion, by which is meant all of the substances in the liquid phase, such as the water and sugar, constitutes at least one-third of the weight of the final product.

It will be understood that although chocolate-flavored product for use as a spread is the preferred embodiment of my invention, other aqueous flavoring or sugar syrups may be used in place of the chocolate. In any case, in its preferred form, my product is a substantially permanent and homogeneous emulsion of an edible fat or oil, either animal or vegetable, or a mixture thereof, and an aqueous flavor-bearing syrup. The product is of smooth, uniform texture and spreadable like butter at ordinary temperatures of use.

I am aware that numerous details of the process may be varied through a wide range without departing from the principles of this invention, and I, therefore, do not purpose limiting the patent granted hereon otherwise than necessitated by the prior art.

I claim as my invention:

1. An edible preparation which is of semi-solid consistency and spreadable at ordinary temperatures, comprising a substantially permanent homogeneous emulsion of a chocolate-bearing aqueous portion and an edible fat, said fat and aqueous portion constituting at least one-half and one-third respectively of said emulsion by weight and an emulsifying agent.

2. A food preparation which is of semi-solid consistency and spreadable at room temperatures, comprising a substantially permanent homogeneous emulsion of an aqueous chocolate material in a fat, and an emulsifying agent, the fat being present in a major proportion.

3. A food preparation which is of uniform appearance, of semi-solid consistency and spreadable at room temperatures, which comprises a substantially permanent homogeneous emulsion of an aqueous syrup of chocolate, cocoa and sugar in a mixture of fats, and an emulsifying agent, said fat mixture being present in the emulsion in a major proportion.

4. A food preparation which is of uniform appearance, of semi-solid consistency and spreadable at room temperatures, which comprises a substantially permanent homogeneous emulsion of an aqueous suspension of chocolate material in a mixture of fats and a glyceryl ester of a higher fatty acid and of sodium sulphoacetate.

5. A food preparation which is of uniform appearance, of semi-solid consistency and spreadable at room temperatures, which comprises a substantially permanent homogeneous emulsion of an aqueous suspension of chocolate material in a mixture of fats and monostearyl glycerine sodium sulphoacetate as the active emulsifying agent.

6. A food preparation which is of semi-solid consistency and spreadable at room temperatures, comprising a substantially permanent homogeneous emulsion of an aqueous portion containing a chocolate material and sugar, a fat, and an emulsifying agent, the aqueous portion and the fat being initially mixed in the proportion of about 1 part of the aqueous portion to 2 parts of the fat by weight.

7. A food preparation which is of semi-solid consistency and spreadable at room temperatures, comprising a substantially permanent homogeneous emulsion of an aqueous portion containing a chocolate material and sugar, a fat containing a substantial proportion of lard, and an emulsifying agent, the aqueous portion and the fat being initially mixed in the proportion of about 1 part of the aqueous portion to 2 parts of the fat by weight.

8. A food product of smooth, uniform texture, which is of semi-solid consistency and spreadable at room temperatures, comprising a substantially permanent homogeneous emulsion of an aqueous portion containing a chocolate material and sugar, a mixture of fats including lard, and an emulsifying agent, the fat mixture being present in the final product in a major proportion.

9. The process of preparing a chocolate flavored fatty composition, of semi-solid consistency and spreadable at room temperatures, which comprises churning a mixture of fats, crystallizing said mixture of fats and emulsifying in the cold by means of an emulsifying agent, an aqueous portion containing a chocolate material with said fat mixture to produce a substantially permanent homogeneous emulsion.

10. The process of preparing a chocolate flavored fatty composition, of semi-solid consistency and spreadable at room temperatures, which comprises churning a mixture of fats, crystallizing said fat mixture, and mixing with said fat mixture in the cold an emulsifying agent and an aqueous portion containing a chocolate material and sugar to produce a substantially permanent homogeneous emulsion of the aqueous portion in said fat mixture.

11. The process of preparing a chocolate-flavored fatty composition, of semi-solid consistency and spreadable at room temperatures, which comprises churning a mixture of fats including a substantial proportion of lard, crystallizing said fat mixture in water at a temperature of about 2° C., and emulsifying with said fat mixture in the cold by means of an emulsifying agent, an aqueous syrup of chocolate, cocoa and sugar in the proportion of about two parts of the fat mixture to one part of aqueous syrup by weight to produce a substantially permanent homogeneous emulsion.

12. The process of preparing a chocolate-flavored fatty composition, of semi-solid consistency and spreadable at room temperatures, which comprises mixing in the cold about two parts of a fat mixture of lard-like consistency with about one part by weight of an aqueous syrup of a sweetened chocolate material and an emulsifying agent including a glyceryl ester of a higher fatty acid and of sodium sulphoacetate to produce a substantially permanent homogeneous emulsion.

13. The process of preparing a chocolate-flavored fatty composition, of semi-solid consistency and spreadable at room temperatures, which comprises mixing in the cold about two parts of a fat mixture of lard-like consistency with about one part by weight of an aqueous syrup of a sweetened chocolate material and an emulsifying agent including monostearyl glycerine sodium sulphoacetate to produce a substantially permanent homogeneous emulsion.

DANIEL A. FARRELL.